(12) United States Patent
Park

(10) Patent No.: US 8,611,414 B2
(45) Date of Patent: Dec. 17, 2013

(54) VIDEO SIGNAL PROCESSING AND ENCODING

(75) Inventor: Gwang Hoon Park, Sungnam-si (KR)

(73) Assignee: University-Industry Cooperation Group of Kyung Hee University, Yongin-Si (KR)

( * ) Notice: Subject to any disclaimer, the term of this patent is extended or adjusted under 35 U.S.C. 154(b) by 770 days.

(21) Appl. No.: 12/707,400

(22) Filed: Feb. 17, 2010

(65) Prior Publication Data

US 2011/0200106 A1    Aug. 18, 2011

(51) Int. Cl.
*H04N 7/24* (2011.01)
*H04N 7/26* (2006.01)
*H04N 7/32* (2006.01)

(52) U.S. Cl.
USPC .......................................... 375/240; 386/109

(58) Field of Classification Search
None
See application file for complete search history.

(56) References Cited

U.S. PATENT DOCUMENTS

| | | | |
|---|---|---|---|
| 7,734,151 B2 * | 6/2010 | Park et al. | 386/329 |
| 7,956,930 B2 * | 6/2011 | Sullivan | 348/581 |
| 8,228,979 B2 * | 7/2012 | Washino | 375/240.01 |
| 2006/0133484 A1 | 6/2006 | Park et al. | |
| 2009/0022220 A1 * | 1/2009 | Vatis et al. | 375/240.12 |
| 2009/0041123 A1 * | 2/2009 | Haskell et al. | 375/240.15 |
| 2009/0196354 A1 * | 8/2009 | Park et al. | 375/240.24 |
| 2009/0225869 A1 * | 9/2009 | Cho et al. | 375/240.26 |
| 2010/0220795 A1 * | 9/2010 | Yin et al. | 375/240.29 |

FOREIGN PATENT DOCUMENTS

WO    WO 2009051690    4/2009

OTHER PUBLICATIONS

Wiegand et al, "Overview of the H.264/AVC Video Coding Standard", IEEE Transactions on Circuits and Systems for Video Technology, vol. 13. No. 7, Jul. 2003, pp. 560-576.*
Schwarz et al, "Overview of the Scalable Video Coding Extension of the H.264/AVC Standard", IEEE Transactions on Circuits and Systems for Video Technology, vol. 17. No. 9, Sep. 2007, pp. 1103-1120.*
Wiegand et al, "Overview of the H.264/AVC Video Coding Standard", IEEE Trans. on Circuits and Systems for Video Technology, vol. 13, No. 7, Jul. 2003, pp. 560-576.*
Zubrzycki et al, "Super Hi-Vision", EBU Technical Review, Jan. 2009, pp. 17-34.*
Schwarz et al, "Overview of the Scalable Video Coding Extension of the H.264/AVC Standard", IEEE Transactions on Circuits and Systems for Video Technology, vol. 17, No. 9, Sep. 2007, pp. 1103-1120.*

(Continued)

*Primary Examiner* — Gims S Philippe
*Assistant Examiner* — Reza Aghevli
(74) *Attorney, Agent, or Firm* — Maschoff Brennan

(57) ABSTRACT

A video signal encoder includes a pre-processor adapted to select a portion of an input video signal and partition the portion into partitions, a first transformer adapted to transform the partitions from a first domain into a second domain, a selector adapted to select representative values from the respective partitions of the second domain, a collector adapted to collect the representative values to form a representative group of values, and a first encoding unit adapted to encode the representative group.

23 Claims, 10 Drawing Sheets

(56) References Cited

OTHER PUBLICATIONS

International Search Report and Written Opinion of the International Searching Authority, of Corresponding PCT Application No. PCT/KR2010/008897, mailed Feb. 24, 2011.
Wiegand, T et. al; "Overview of the H.264/AVC Video Coding Standard"; IEEE Transactions on Circuits and Systems for Video Technology; vol. 13 No. 7 Jul. 2003.
Zubrzycki, J et. al; "Super Hi-Vision—the London—Amsterdam live contribution link"; pp. 17-34; EBU Technical Review, Jan. 2009.
Chih-Da Chien, et al "A 252kgate/71mW Multi-Standard Multi-Channel Video Decoder for High Definition Video Applications" ISSCC 20071 Session 151 Multimedia and Parallel Signal Processors / 15.7.
Yi-Shin Tung, et al "DSP-Based Multi-Format Video Decoding Engine for Media Adapter Applications" IEEE Transactions on Consumer Electronics, vol. 51, No. 1, Feb. 2005, pp. 273-280.

* cited by examiner

VIDEO SIGNAL PROCESSING AND ENCODING

BACKGROUND

Large displays, such as large wall-sized televisions (about 70" to 120") called UDTVs (Ultra Definition TVs), have been deployed as an attractive home appliance, due to consumer's needs for immersive sensations and technology innovation of displays. UDTVs use a large amount of bandwidth in transmitting UDTV video on communications or broadcasting lines. Thus, there is an interest in developing UDTVs having higher coding efficiency.

SUMMARY

Techniques relating to video signal processing are provided. In one embodiment, a video signal encoder includes a pre-processor adapted to select a portion of an input video signal and partition the portion into partitions, a first transformer adapted to transform the partitions from a first domain into a second domain, a selector adapted to select representative values from the respective partitions of the second domain, a collector adapted to collect the representative values to form a representative group of values, and a first encoding unit adapted to encode the representative group.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
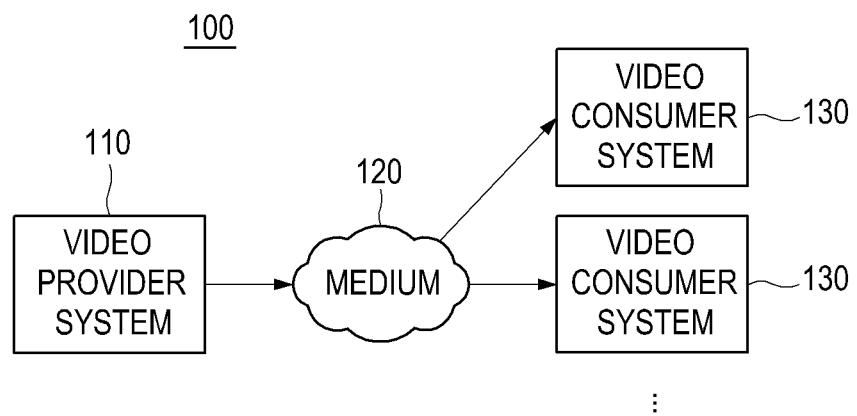
FIG. 1 schematically shows an example configuration of a system that provides video between a provider and a consumer.

All arranged according to at least one embodiment described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 schematically shows an example configuration of a system that provides video between a provider and a consumer. A system 100 has a video provider system 110 that provides a video signal to a medium 120, and one or more video consumer systems 130 that receive the video signal from medium 120. To provide the video signal efficiently, video provider system 110 may encode the video signal before providing it to medium 120, and video consumer systems 130 may decode the encoded video signal.

Medium 120 may include a recording medium, a wired or wireless transmission medium, or any other medium that is considered suitable to convey the video signal from video provider system 110 to video consumer systems 130. In some cases, medium 120 may include a combination of two or more different kinds of media therein.

Video consumer systems 130 may include various kinds of apparatuses adapted to process the video signal (for example, display, re-encode, store, transmit and/or use in any other conceivable manner). Among them are large displays, such as wall-sized televisions (about 70" to 120") called UDTVs (Ultra Definition TVs). Some typical resolutions of a UDTV may be 3840 pixels×2160 lines (4K-UDTV) or 7680 pixels× 4320 lines (8K-UDTV). However, it should be appreciated that the resolution is not limited to the aforementioned resolutions, but may be larger or smaller according to the circumstances. In some cases, the video consumer systems 130 may include a HDTV or even smaller sized TV set-top.

In some embodiments, video provider system 110 may perform a scalable encoding to provide realistic video to video consumer systems 130. Scalable encoding may include an encoding scheme that generates a scalable bit-stream. A video bit-stream may be called scalable when parts of the bit-stream can be removed in a way that the resulting substream forms another valid bit-stream for some target decoder.

Scalable encoding may enable encoding of a high-quality video bit-stream that contains one or more subset bit-streams that may themselves be decoded with a complexity and reconstruction quality similar to that achieved using the same quantity of data as in the subset bit-stream. In some embodiments, the subset bit-stream may be derived by dropping packets from the larger bit-stream. A subset bit-stream may represent a lower spatial or temporal resolution or a lower quality video signal (each separately or in combination) compared to the bit-stream it is derived from. Through the use of scalable encoding, video may be simultaneously transmitted or stored with a variety of spatial or temporal resolutions or qualities.

Figure 2:
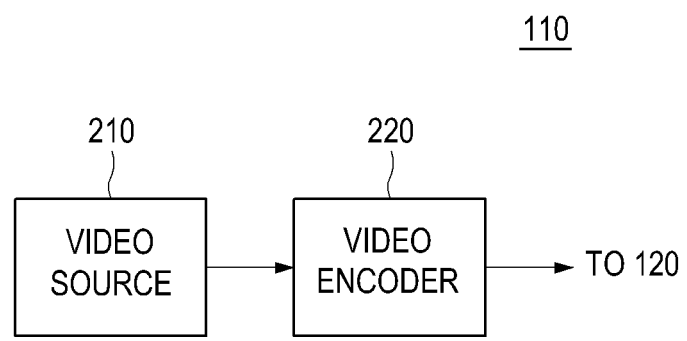
FIG. 2 illustrates an example configuration of the video provider system illustrated in FIG. 1.

FIG. 2 illustrates an example configuration of the video provider system illustrated in FIG. 1. Video provider system 110 encodes a video signal in accordance with one embodiment. Referring to FIG. 2, video provider system 110 may include a video source 210 and a video encoder 220.

Video source 210 may be any device capable of generating a sequence of video signals. A video signal may be any signal or at least a part of a signal that represents video data. Video source 210 may include, for example, a television antenna and a receiver unit, a video cassette player, a video camera, a disk storage device capable of receiving/storing a video signal, and the like. The video signal may be transmitted to video encoder 220.

Video encoder 220 may encode the video signal to generate an encoded video signal. In some embodiments, the encoded video signal from video encoder 220 may include base-layer data corresponding to a relatively low resolution compared to that of the original video signal from video source 210. Video encoder 220 may further output the encoded video signal to a decoder-readable medium, e.g., medium 120. In this way, in some embodiments, video encoder 220 may encode a video signal in decoder-readable medium 120. For example, video encoder 220 may record the encoded video signal on decoder-readable medium 120.

Figure 3:
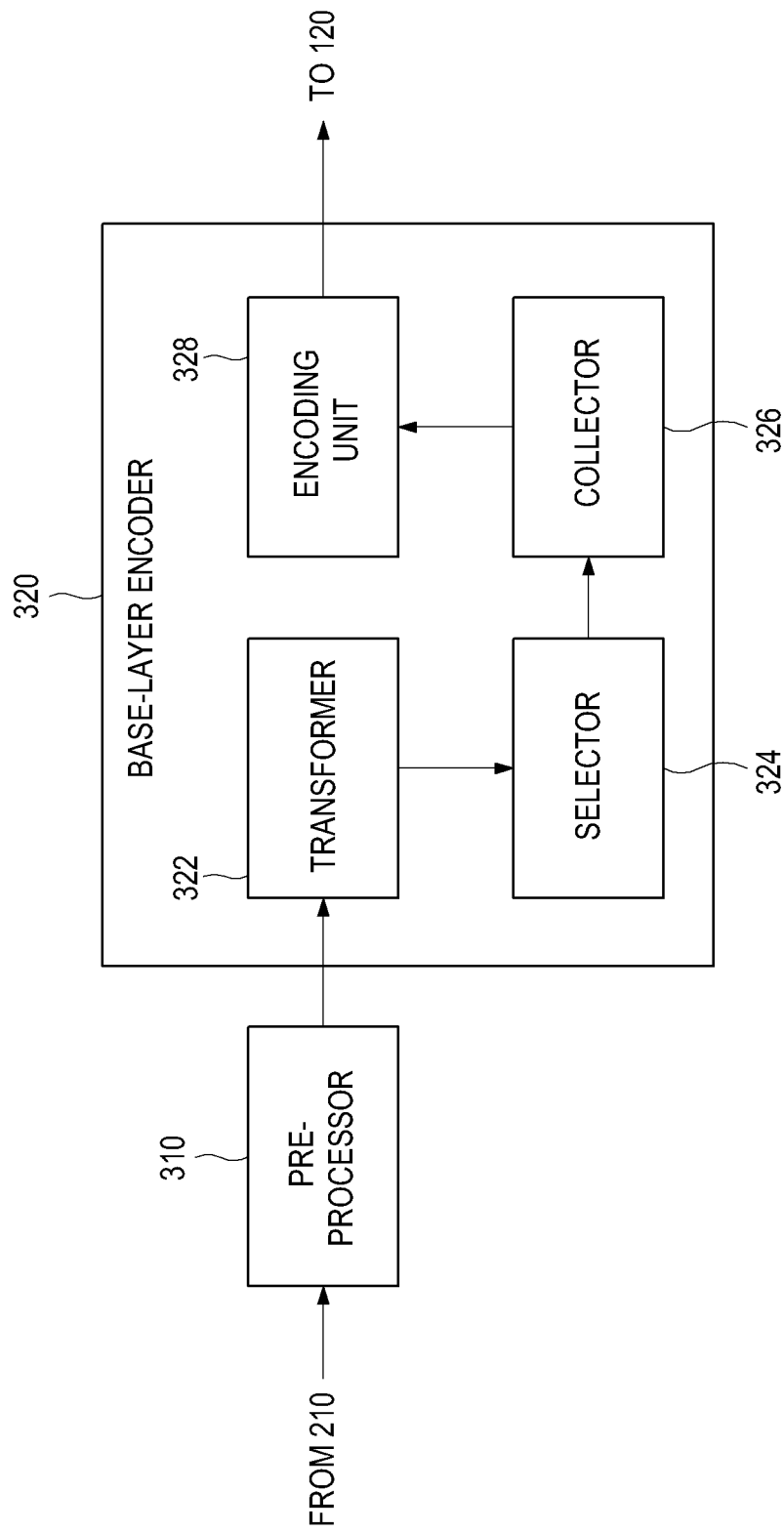
FIG. 3 illustrates an embodiment of the video encoder illustrated in FIG. 2.

FIG. 3 illustrates an embodiment of the video encoder illustrated in FIG. 2. Referring to FIG. 3, video encoder 220 may include a pre-processor 310 and a base-layer encoder 320.

Pre-processor 310 may receive an input video signal from video source 210, and select a portion ("selected portion") of the input video signal to be encoded. Here, the term "selected portion" refers to a portion of or an entire input video signal to be encoded. In some embodiments, the selected portion may correspond to, for example, a macro-block including 16×16 pixels. In other words, the input video signal may be encoded by macro-blocks. Note that the selected portion determined by pre-processor 310 is not limited to the 16×16 macro-block. For example, a 32×32 super-block, a 64×64 ultra-block, a smaller block, or even a non-square-shaped object may also correspond to the selected portion determined by pre-processor 310.

Figure 4:
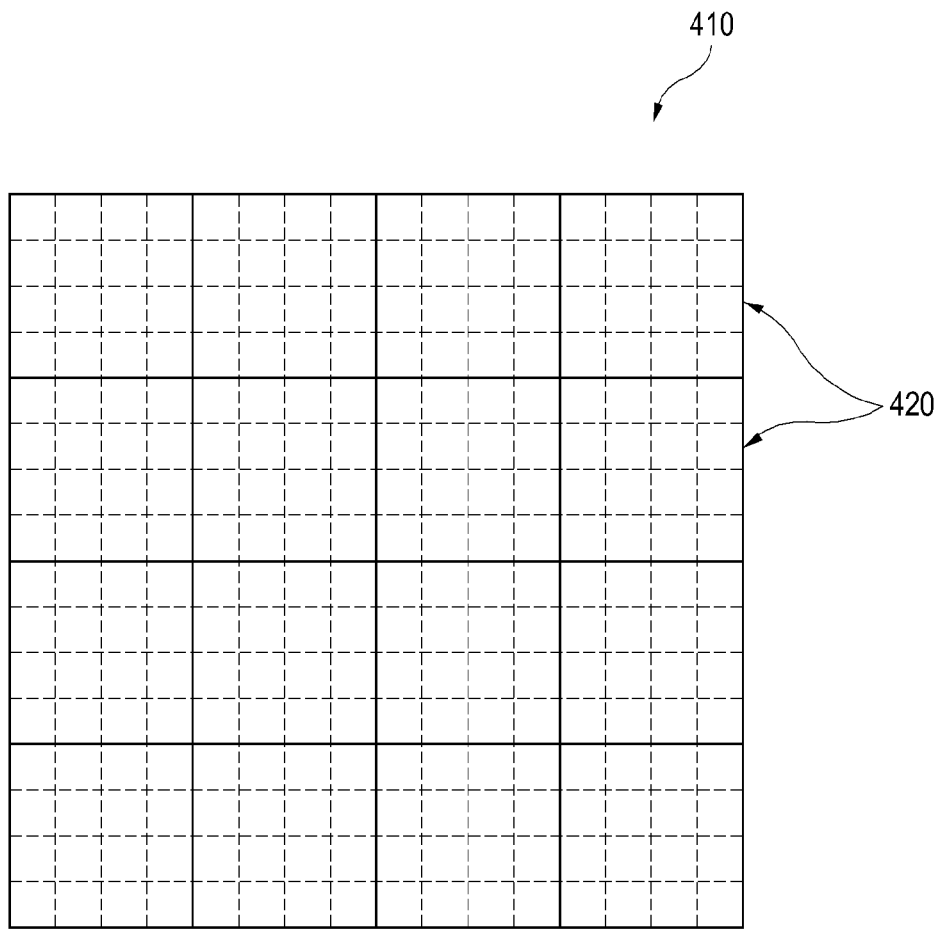
FIG. 4 illustrates an example of a portion of the video partitioned into multiple partitions.

Pre-processor 310 may also partition the selected portion into multiple partitions. In some embodiments, the partitions may be 4×4 sub-blocks. In the case that the selected portion is a 16×16 macro-block, pre-processor 310 may provide sixteen (16) partitions for the selected portion. FIG. 4 illustrates an example of the selected portion partitioned into multiple partitions. In FIG. 4, a selected portion 410 illustrated as a 16×16 macro-block is partitioned into sixteen (16) partitions 420. Each partition 420 is illustrated as 4×4 sub-block. Note that partitions 420 are not limited to 4×4 sub-blocks. In some embodiments, partitions 420 may have a different size or shape, such as an 8×8 square, a 16×16 square or even a non-square-shape.

Referring back to FIG. 3, base-layer encoder 320 may generate encoded base-layer data corresponding to a relatively low resolution. In some embodiments, the base-layer data may correspond to a ¼×4 resolution of the original size. For example, if the input video signal has 7680 pixels and 4320 lines (8K-UDTV), then the ¼×4 base-layer data may correspond to a resolution of 1920×1080 in total. Further, if the input video signal has 3840 pixels and 2160 lines (4K-UDTV), the ¼×4 base-layer data may correspond to a resolution of 960×540 in total. Note that the resolution of the base-layer data is not limited to the above example. For example, in some other embodiments, it may be possible that a selected portion is a 32×32 superblock and the partitions are 16×16 macro-blocks, and thus, the base-layer data may correspond to a ½×2 resolution of the original size. In the case that the input video signal has 3840 pixels and 2160 lines (4K-UDTV), the ½×2 base-layer data may correspond to a resolution of 1920×1080 in total.

Base-layer encoder 320 may include a transformer 322, a selector 324, a collector 326 and an encoding unit 328.

Transformer 322 (or first transformer) may receive partitions 420 from pre-processor 310, and transform partitions 420 into a different domain ("first transformation"). In some embodiments, transformer 322 may transform partitions 420 from a spatial domain into a frequency domain by performing, for example, a discrete cosine transform (DCT). However, other kinds of transformations may also be applied without departing from the spirit and scope of the present disclosure. As well known in the art, a DCT may express a sequence of finite data points in terms of a sum of cosine functions oscillating at different frequencies. For example, in JPEG or MPEG, when DCT is applied to an 8×8 block, the result may be an 8×8 transform coefficient array in which the (0,0) element (top-left) is the DC (zero-frequency) value and entries with increasing vertical and horizontal index values (AC coefficients) represent higher vertical and horizontal spatial frequencies. Thus, by transformer 322, the pixel values in each partition 420 may be transformed into one DC value and multiple AC coefficients. For example, if partition 420 is a 4×4 sub-block including sixteen (16) pixel values, transformer 322 may perform a 4×4 DCT to the 4×4 sub-block to derive one DC value and fifteen (15) AC coefficients. In some embodiments, the DC value may be derived to correspond to the mean value of the 4×4 pixel values in the spatial domain.

Figure 5A:
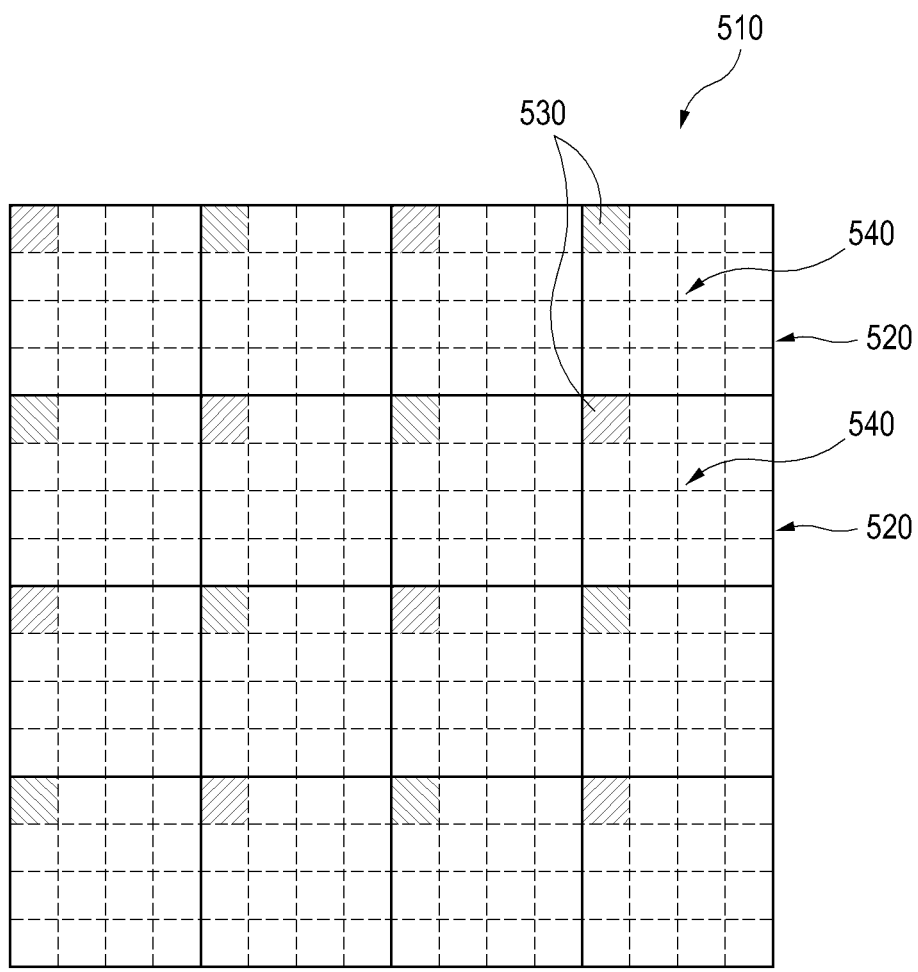
FIGS. 5A and 5B illustrate examples of transformed partitions and a representative group.

FIG. 5A illustrates an example where each of partitions 520 (4×4 sub-blocks) in a selected portion 510 (a 16×16 macro-block) is transformed into one DC value 530 and fifteen (15) AC coefficients 540. In FIG. 5A, after the transformation, selected portion 510 includes sixteen (16) DC values 530, each corresponding to one partition 520.

Referring back to FIG. 3, selector 324 may receive the transformed partitions from transformer 322, and select a representative value from each of the transformed partitions. In some embodiments, selector 324 may select a DC value from each of the transformed partitions and discard AC coefficients. The DC value may be used as a representative value of the corresponding partition. However, according to the circumstances and the type of transformation, the representative value may be selected in a different way without departing from the spirit and scope of the present disclosure.

Figure 5B:
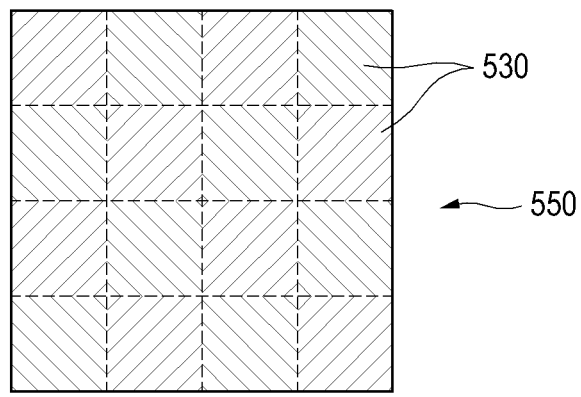

Collector 326 may receive the selected representative values from selector 324, and collect the representative values to form a representative group of values. For example, DC values 530 shown in FIG. 5A may be collected to form a 4×4 sub-block 550 including DC values 530 as shown in FIG. 5B. The entire resultant 4×4 sub-block 550 may represent selected portion 510 of FIG. 5A, since selected portion 510 of FIG. 5A includes sixteen (16) partitions 520 therein, and sixteen (16) DC values 530 in 4×4 sub-block 550 may respectively represent sixteen (16) partitions 520 in selected portion 510.

Then, encoding unit 328 (or first encoding unit) may encode the representative group of values. Various known techniques or modules may be used to encode the representative group. In one embodiment of encoding, a representative group of values may be treated as if it includes normal pixel values of a typical image. For example, in some embodiments, 4×4 sub-block 550 including sixteen (16) DC values 530 shown in FIG. 5B may be treated like a normal sub-block of a typical image to be encoded.

In this way, base-layer encoder 320 may generate encoded base-layer data corresponding to a relatively low resolution of a selected portion. For example, when the selected portion is a 16×16 macro-block partitioned into sixteen (16) 4×4 sub-blocks, base-layer encoder 320 may generate an encoded signal corresponding to a 4×4 base-layer image of the selected portion.

Figure 6:
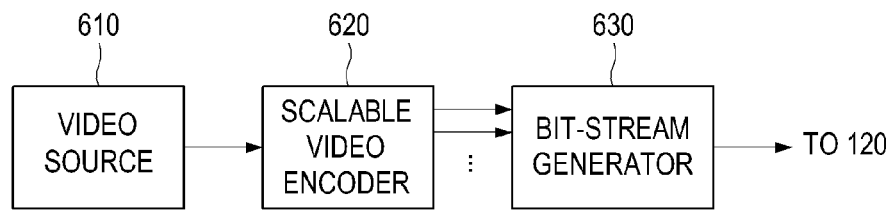
FIG. 6 illustrates an example configuration of a video provider system that encodes a video signal in accordance with another embodiment.

FIG. 6 illustrates an example configuration of a video provider system that encodes a video signal in accordance with another embodiment. Referring to FIG. 6, video provider system 110 may include a video source 610, a scalable video encoder 620 and a bit-stream generator 630. Video source 610 may be similar to video source 210 discussed above with reference to FIG. 2, and thus, will not be described repeatedly in detail.

Scalable video encoder 620 may encode the video signal to provide at least two streams of encoded data to bit-stream generator 630. In some embodiments, the streams from scalable video encoder 620 may include base-layer data corresponding to a relatively low resolution and at least one enhancement-layer data corresponding to a relatively high resolution(s).

Bit-stream generator 630 may receive the streams of encoded data from scalable video encoder 620, and generate a single bit-stream that includes the streams of encoded data therein. In other words, bit-stream generator 630 may output a scalable encoded bit-stream to a decoder-readable medium, e.g., medium 120. In some embodiments, decoder-readable medium 120 may include the scalable encoded bit-stream therein in a manner that a decoder may read it from medium 120. In this way, in some embodiments, scalable video encoder 620 may make decoder-readable medium 120 to include therein a video signal encoded by scalable video encoder 620. For example, scalable video encoder 620 may record the encoded video signal on decoder-readable medium 120.

Figure 7:
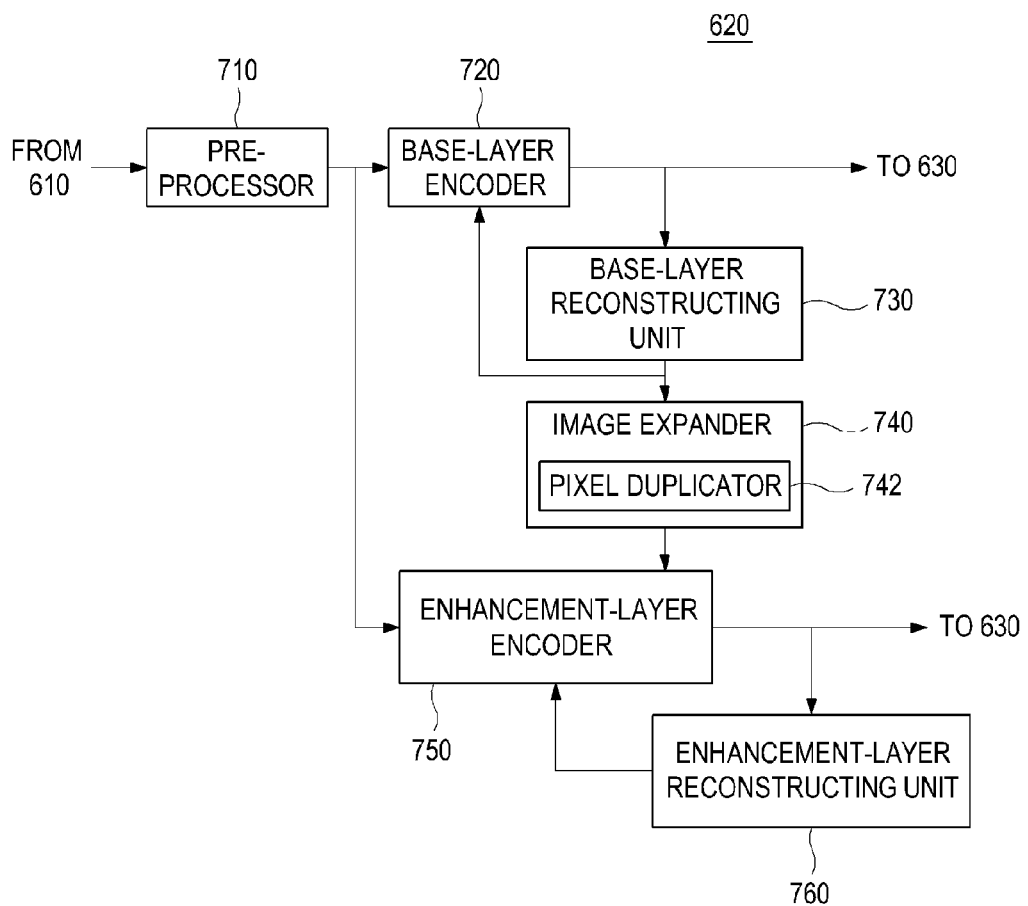
FIG. 7 illustrates an embodiment of the scalable video encoder illustrated in FIG. 6.

FIG. 7 illustrates an embodiment of the scalable video encoder illustrated in FIG. 6. Referring to FIG. 7, scalable video encoder 620 may include a pre-processor 710, a base-layer encoder 720, a base-layer reconstructing unit 730, an image expander 740, an enhancement-layer encoder 750 and an enhancement-layer reconstructing unit 760. Pre-processor 710 may be similar to pre-processor 310 discussed above with reference to FIG. 3, and thus, will not be described repeatedly in detail.

Base-layer encoder 720 may generate encoded base-layer data corresponding to a relatively low resolution. In some embodiments, the base-layer data may correspond to a ¼×4 resolution of the original size. For example, if the input video signal has 7680 pixels and 4320 lines (8K-UDTV), then the ¼×4 base-layer data may correspond to a resolution of 1920× 1080 in total. Further, if the input video signal has 3840 pixels and 2160 lines (4K-UDTV), the ¼×4 base-layer data may correspond to a resolution of 960×540 in total. Note that the resolution of the base-layer data is not limited to the above example. For example, in some other embodiments, it may be possible that a selected portion is a 32×32 superblock and the partitions are 16×16 macro-blocks, and thus, the base-layer data may correspond to a ½×2 resolution of the original size. In the case that the input video signal has 3840 pixels and 2160 lines (4K-UDTV), the ½×2 base-layer data may correspond to a resolution of 1920×1080 in total. Details of base-layer encoder 720 in accordance with one embodiment will be described later.

Base-layer reconstructing unit 730 (or first reconstructing unit) may reconstruct a base-layer image from the encoded base-layer data. For reconstruction of the image, various techniques, which may be related to, for example, intra-texture coding, inter-texture coding, temporal decomposition, motion compensation and the like, may be employed. Image expander 740 may then expand the reconstructed base-layer image up to the original size, that is, the size of the selected portion. For example, if the base-layer data has a ¼×4 resolution of the original size, image expander 740 may duplicate a pixel in the reconstructed base-layer image to sixteen (16) (that is, 4×4) pixels in the expanded image by using a pixel duplicator 742. Note that other techniques such as interpolation may also be employed for image expansion. The expanded base-layer image may be provided to enhancement-layer encoder 750 (or second encoding unit). Further, in some embodiments, the reconstructed base-layer image from base-layer reconstructing unit 730 may also be fed back as a reference image to base-layer encoder 720 for inter-texture coding, which will be described later.

Enhancement-layer encoder 750 may receive selected portion 410 from pre-processor 710 and the expanded base-layer image from image expander 740. Then, enhancement-layer encoder 750 may generate at least one encoded enhancement-layer data corresponding to selected portion 410 using the expanded base-layer image. Details of enhancement-layer encoder 750 in accordance with one embodiment will be described later.

Enhancement-layer reconstructing unit 760 (or second reconstructing unit) may then reconstruct an enhancement-layer image from the encoded enhancement-layer data, and feed it back to enhancement-layer encoder 750. For reconstruction of the image, various techniques, such as temporal decomposition, motion compensation and the like, may be employed.

Figure 8:
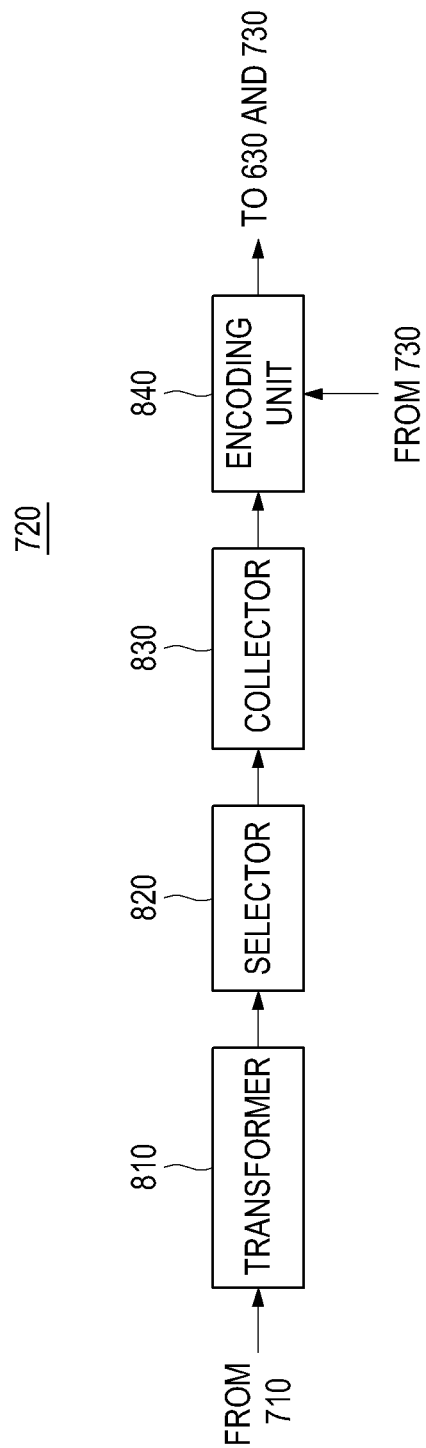
FIG. 8 shows an embodiment of the base-layer encoder illustrated in FIG. 7.

FIG. 8 shows an embodiment of the base-layer encoder illustrated in FIG. 7. Referring to FIG. 8, base-layer encoder 720 may include a transformer 810, a selector 820, a collector 830 and an encoding unit 840. Transformer 810 (or first transformer), selector 820 and collector 830 may be similar to transformer 322, selector 324 and collector 326 discussed above with reference to FIG. 3, and thus, will not be described repeatedly in detail.

After transformer 810, selector 820 and collector 830 cooperate to form a representative group of values, encoding unit 840 (or first encoding unit) may treat the representative group of values as including normal pixel values of a typical image to encode the representative group of values. Various techniques or modules may be used to encode the representative group.

Figure 9:
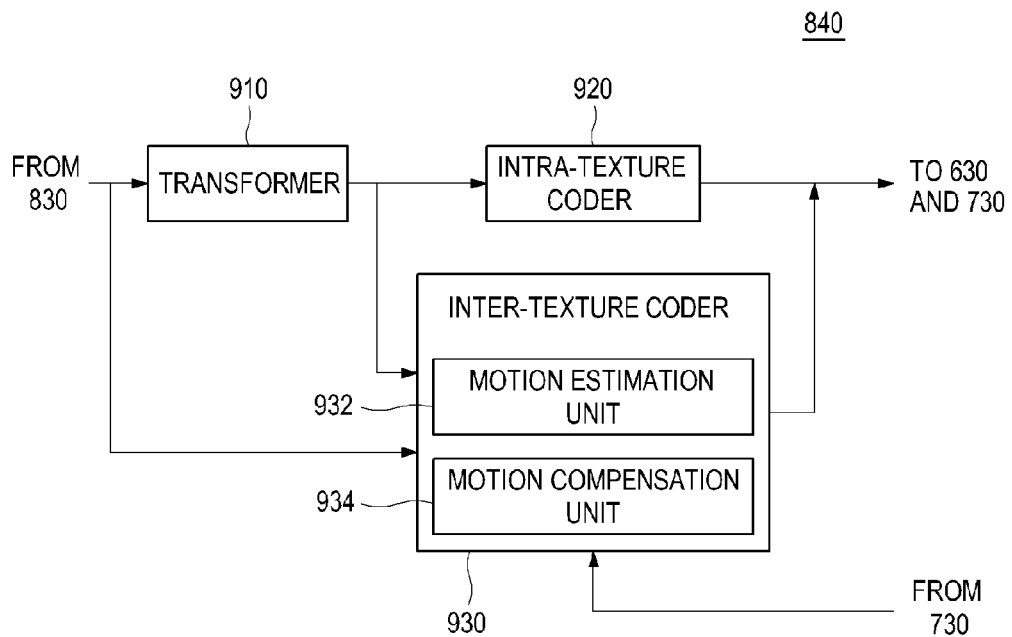
FIG. 9 shows an embodiment of the encoding unit illustrated in FIG. 8.

FIG. 9 shows an embodiment of the encoding unit illustrated in FIG. 8. Referring to FIG. 9, encoding unit 840 may include a transformer 910, an intra-texture coder 920 and an inter-texture coder 930.

Transformer 910 (or second transformer) may receive the representative group of values and re-transform the representative group into another domain. For example, in some embodiments, 4×4 sub-block (e.g., 4×4 sub-block 550 including sixteen (16) DC values 530 shown in FIG. 5B) may be treated like a normal sub-block of an image, and may be re-transformed into DCT coefficients, that is, one (1) DC value and fifteen (15) AC coefficients. This process may be referred to as a second transformation after the transformation, i.e., a first transformation, performed by a first transformer, e.g., transformer 810.

After the second transformation by transformer 910, intra-texture coder 920 may perform intra-texture coding using the resultant DCT coefficients. Various techniques, such as run-length encoding and variable-length coding, may be used for the intra-texture coding.

Inter-texture coder 930 may perform inter-texture coding using the DCT coefficients from transformer 910 and a previous reconstructed image from base-layer reconstructing unit 730. In the inter-texture coding, inter-texture coder 930 may perform motion estimation and/or motion compensation using a motion estimation unit 932 and a motion compensation unit 934. The motion estimation and the motion compensation may be performed based on the representative group (including, for example, sixteen (16) DC values) which may be regarded as a normal sub-block including normal pixel values of an image.

In this way, base-layer encoder 720 may generate encoded base-layer data corresponding to a relatively low resolution of a selected portion. For example, when the selected portion is a 16×16 macro-block partitioned into sixteen (16) 4×4 sub-blocks, base-layer encoder 720 may generate an encoded signal corresponding to a 4×4 base-layer image for the portion.

Figure 10:
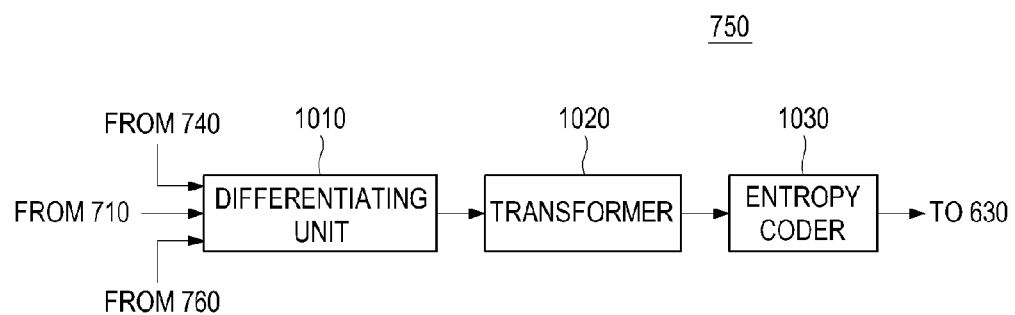
FIG. 10 shows an embodiment of the enhancement-layer encoder illustrated in FIG. 7.

FIG. 10 shows an embodiment of the enhancement-layer encoder illustrated in FIG. 7. Referring to FIG. 10, enhancement-layer encoder 750 includes a differentiating unit 1010, a transformer 1020 and an entropy coder 1030.

In some embodiments, differentiating unit 1010 may receive an original portion (e.g., selected portion 410) determined by pre-processor 710 and the expanded base-layer image from image expander 740. Differentiating unit 1010 may then obtain a differential image between the original portion and the expanded base-layer image.

Transformer 1020 (or third transformer) may transform the differential image obtained by differentiating unit 1010 into another domain, for example, a frequency domain. In some embodiments, transformer 1020 may perform a discrete cosine transform (DCT) for this purpose.

Entropy coder 1030 may perform entropy coding for the transformed differential image, to generate encoded enhancement-layer data. The entropy coding may include various techniques such as run-length encoding, variable-length coding and the like.

In the above embodiment, differentiating unit 1010 uses the original portion and the base-layer image derived from the original portion. Accordingly, the above encoding scheme may be referred to as intra-coding. However, enhancement-layer encoder 750 is not limited to the intra-coding.

For example, in some other embodiments, differentiating unit 1010 may receive a reconstructed enhancement-layer image from enhancement-layer reconstructing unit 760. Differentiating unit 1010 may then obtain a differential image between the reconstructed enhancement-layer image and the expanded base-layer image. Since the reconstructed enhancement-layer image may be obtained by referring to one or more reference images other than the original portion, such encoding scheme may be referred to as inter-coding.

It should be appreciated that, in some embodiments, differentiating unit 1010 may be configured to employ both of the intra-coding and the inter-coding as necessary.

In this way, enhancement-layer encoder 750 may generate enhancement-layer data corresponding to the original portion using the expanded base-layer image.

Figure 11:
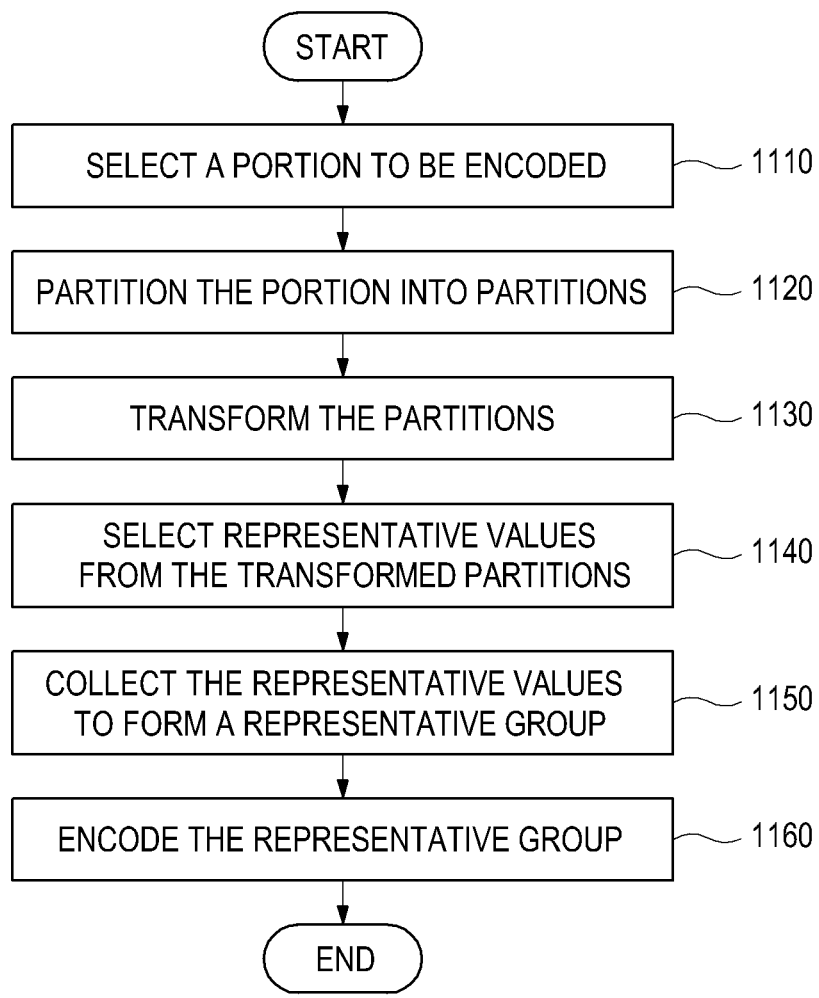
FIG. 11 illustrates an example flow chart of a video signal encoding method according to one embodiment.

FIG. 11 illustrates an example flow chart of a video signal encoding method according to one embodiment that may be performed by a video signal encoder, and more particularly, by the respective components in the video signal encoder.

Referring to FIG. 11, the method may start by selecting a portion (selected portion) of an input video signal to be encoded (block 1110). The portion may then be partitioned into multiple partitions (block 1120). In some embodiments, the portion may correspond to a 16×16 macro-block and the partitions may correspond to 4×4 sub-blocks.

The partitions may be transformed to a different domain (first transformation) (block 1130). For example, the partitions may be transformed from a spatial domain into a frequency domain by performing a discrete cosine transform (DCT). Then, a representative value may be selected from each of the transformed partitions (block 1140). In some embodiments, a DC value after the DCT may be selected as the representative value. The representative values for the partitions may be collected to form a representative group of values (block 1150). In some embodiments, the representative group may include sixteen (16) DC values, each DC value representing a 4×4 sub-block.

The representative group may then be encoded (block 1160). Various techniques may be used to encode the representative group. In some embodiments, the representative group may be regarded as a normal 4×4 image portion. In this case, the representative group may be transformed again into a frequency domain by performing a DCT (second transformation). After this second transformation, encoding unit 840 may also perform intra-texture coding and/or inter-texture coding based at least partially on the DCT coefficients obtained by the second transformation.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 12:
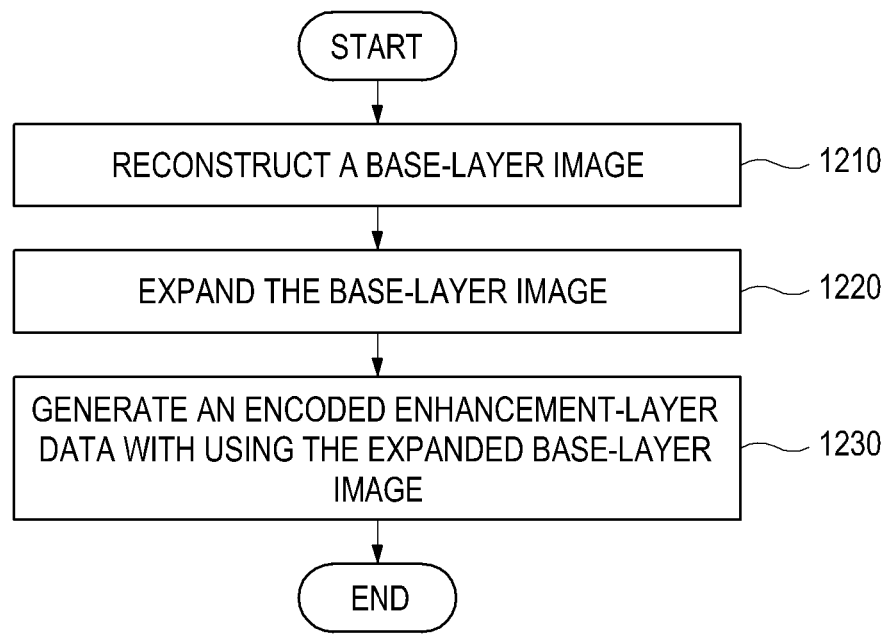
FIG. 12 illustrates an example of an additional flow chart of a video signal encoding method according to one embodiment.

FIG. 12 illustrates an example of an additional flow chart of a video signal encoding method according to one embodiment that may be further performed by a video signal encoder, and more particularly, by the respective components in the video signal encoder.

Referring to FIG. 12, the method may reconstruct a base-layer image (block 1210). In some embodiments, the base-layer image may be reconstructed based at least partially on the representative group encoded by block 1160 of FIG. 11. Then, the reconstructed base-layer image may be expanded (block 1220), for example, up to the size of the portion determined by block 1110 of FIG. 11. The method may generate encoded enhancement-layer data corresponding to the portion using the expanded base-layer image (block 1230). Various techniques, such as differentiation, transformation, entropy coding, temporal decomposition, motion compensation and the like, may be employed for generation of the encoded enhancement-layer data.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A video signal encoder comprising:
   a pre-processor adapted to select a portion of an input video signal and to partition the portion into partitions, the input video signal corresponding to a first resolution;
   a first transformer adapted to transform the partitions from a first domain into a second domain;
   a selector adapted to select representative values from the respective partitions of the second domain based on a second resolution that is smaller than the first resolution and that corresponds to an output video;
   a collector adapted to collect the representative values to form a representative group of the representative values, the representative group corresponding to the second resolution; and
   a first encoding unit adapted to encode the representative group to generate the output video corresponding to the second resolution.

2. The video signal encoder of claim 1, wherein the first resolution includes at least 7680 pixels and at least 4320 lines.

3. The video signal encoder of claim 1, wherein the first resolution includes at least 3840 pixels and at least 2160 lines.

4. The video signal encoder of claim 1, wherein the first domain is a spatial domain and the second domain is a frequency domain.

5. The video signal encoder of claim 4, wherein the first transformer is adapted to perform a discrete cosine transform (DCT) on the partitions, and the selector is adapted to select DC values of the partitions of the second domain.

6. The video signal encoder of claim 1, wherein the portion corresponds to a macro-block of the input video signal and the partitions correspond to sub-blocks constituting the portion.

7. The video signal encoder of claim 1, wherein the portion corresponds to a 32×32 sized block of the input video signal.

8. The video signal encoder of claim 1, wherein the first encoding unit comprises:
   a second transformer adapted to transform the representative group; and
   an intra-coder adapted to perform intra-texture coding of the transformed representative group.

9. The video signal encoder of claim 1, wherein the first encoding unit comprises:
   an inter-coder adapted to perform inter-texture coding of the representative group compared to at least one reference image.

10. The video signal encoder of claim 9, wherein the inter-coder is further adapted to perform motion estimation and motion compensation of the representative group.

11. The video signal encoder of claim 1, further comprising:
    a first reconstructing unit adapted to reconstruct a reference image from the encoded representative group.

12. The video signal encoder of claim 11, further comprising:
    an image expander adapted to expand the reconstructed image to form an expanded image; and
    a second encoding unit adapted to encode the portion determined by the pre-processor using the expanded image.

13. The video signal encoder of claim 12, wherein the expander comprises:
    a pixel duplicator adapted to duplicate a value in the reconstructed image to form multiple pixels in the expanded image.

14. The video signal encoder of claim 12, wherein the second encoding unit comprises:
    a differentiating unit adapted to determine a differential image between the portion and the expanded image; and
    a third transformer adapted to transform the differential image; and
    an entropy coder adapted to perform entropy coding of the transformed differential image.

15. The video signal encoder of claim 12, further comprising:
    a second reconstructing unit adapted to reconstruct a second reconstructed image by temporal decomposition and motion compensation, wherein the second reconstructed image is the same size as the portion determined by the pre-processor, wherein the second encoding unit comprises:
a differentiating unit adapted to determine a differential image between the second reconstructed image and the expanded image;
a third transformer adapted to transform the differential image; and
an entropy coder adapted to perform entropy coding of the transformed differential image.

16. The video signal encoder of claim 12, further comprising:
a bit-stream generator adapted to generate a bit-stream including the encoded representative group and the encoded portion.

17. A non-transitory decoder-readable medium comprising a video signal encoded by the video signal encoder according to claim 1.

18. A method for encoding a video signal, the method comprising:
selecting a portion of an input video signal and partitioning the portion into partitions, the input video signal corresponding to a first resolution;
transforming the partitions from a first domain into a second domain;
selecting representative values from the respective partitions of the second domain based on a second resolution that is smaller than the first resolution and that corresponds to an output video, the representative values respectively representing the partitions;
collecting the representative values to form a representative group of the representative values, the representative group corresponding to the second resolution; and
encoding the representative group to generate the output video corresponding to the second resolution.

19. The method of claim 18, further comprising:
reconstructing a reference image from the encoded representative group;
expanding the reconstructed image to form an expanded image; and
generating encoded data corresponding to the determined portion using the expanded image.

20. A video signal encoder comprising:
a pre-processor adapted to select a portion of an input video signal and to partition the portion into partitions, the input video signal corresponding to a first resolution;
a base-layer encoder coupled to the pre-processor, the base-layer encoder comprising:
a first transformer adapted to transform the partitions from a first domain into a second domain;
a selector adapted to select representative values from the respective partitions of the second domain based on a second resolution that is smaller than the first resolution and that corresponds to an output video;
a collector adapted to collect the representative values to form a representative group of the representative values, the representative group corresponding to the second resolution; and
a first encoding unit adapted to encode the representative group to generate the output video corresponding to the second resolution, wherein the first encoding unit comprises:
a second transformer adapted to transform the representative group;
an intra-coder adapted to perform intra-texture coding of the transformed representative group; and
an inter-coder adapted to perform inter-texture coding of the representative group compared to at least one reference image, wherein the inter-coder is further adapted to perform motion estimation and motion compensation of the representative group;
a first reconstructing unit adapted to reconstruct a reference image from the encoded representative group;
an image expander adapted to expand the reconstructed image to form an expanded image, wherein the image expander comprises a pixel duplicator adapted to duplicate a value in the reconstructed image to form multiple pixels in the expanded image;
a second encoding unit adapted to encode the portion determined by the pre-processor using the expanded image, wherein the second encoding unit comprises:
a differentiating unit adapted to determine a first differential image between the portion and the expanded image;
a third transformer adapted to transform the first differential image; and
an entropy coder adapted to perform entropy coding of the transformed first differential image; and
a second reconstructing unit adapted to reconstruct a second reconstructed image by temporal decomposition and motion compensation, wherein the second reconstructed image is the same size as the portion determined by the pre-processor,
wherein:
the differentiating unit of the second encoding unit is further adapted to determine a second differential image between the second reconstructed image and the expanded image;
the third transformer of the second encoding unit is further adapted to transform the second differential image; and
the entropy coder of the second encoding unit is further adapted to perform entropy coding of the transformed second differential image.

21. A non-transitory decoder-readable medium comprising a video signal encoded by the video signal encoder according to claim 20.

22. The video signal encoder of claim 20, wherein the first resolution includes:
at least 7680 pixels and at least 4320 lines; or
at least 3840 pixels and at least 2160 lines.

23. The video signal encoder of claim 20, wherein the first transformer is adapted to perform a discrete cosine transform (DCT) on the partitions, and the selector is adapted to select DC values of the partitions of the second domain.

* * * * *

UNITED STATES PATENT AND TRADEMARK OFFICE
CERTIFICATE OF CORRECTION

PATENT NO.        : 8,611,414 B2                                    Page 1 of 1
APPLICATION NO.   : 12/707400
DATED             : December 17, 2013
INVENTOR(S)       : Park It is certified that error appears in the above-identified patent and that said Letters Patent is hereby corrected as shown below:

On the Title Page, in item (56), under "OTHER PUBLICATIONS", in Column 2, Lines 8-10, delete "Wiegand et al, "Overview of the H.264/AVC Video Coding Standard", IEEE Trans. on Circuits and Systems for Video Technology, vol. 13, No. 7, Jul. 2003, pp. 560-576.".

On the Title Page, in item (56), under "OTHER PUBLICATIONS", in Column 2, Lines 11-12, delete "Zubrzycki et al, "Super Hi-Vision", EBU Technical Review, Jan. 2009, pp. 17-34.".

On the Title Page, in item (56), under "OTHER PUBLICATIONS", in Column 2, Lines 13-16, delete "Schwarz et al, "Overview of the Scalable Video Coding Extension of the H.264/AVC Standard", IEEE Transactions on Circuits and Systems for Video Technology, vol. 17, No. 9, Sep. 2007, pp. 1103-1120.".

On Title Page 2, in item (56), under "OTHER PUBLICATIONS", in Column 1, Lines 4-6, delete "Wiegand, T et. al; "Overview of the H.264/AVC Video Coding Standard"; IEEE Transactions on Circuits and Systems for Video Technology; vol. 13 No. 7 Jul. 2003.".

On Title Page 2, in item (56), under "OTHER PUBLICATIONS", in Column 2, Line 5, delete "ISSCC 20071 Session 151" and insert -- ISSCC 2007/ Session 15 / --, therefor.

Signed and Sealed this
Thirteenth Day of May, 2014

Michelle K. Lee
*Deputy Director of the United States Patent and Trademark Office*